(12) United States Patent
Suzuki et al.

(10) Patent No.: US 7,068,315 B1
(45) Date of Patent: Jun. 27, 2006

(54) SOLID-STATE IMAGING DEVICE, ITS DRIVING METHOD, AND CAMERA SYSTEM

(75) Inventors: Ryoji Suzuki, Kanagawa (JP); Takahisa Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 779 days.

(21) Appl. No.: 09/612,752

(22) Filed: Jul. 10, 2000

(30) Foreign Application Priority Data

Jul. 12, 1999 (JP) ................................. 11-196875

(51) Int. Cl.
*H04N 5/335* (2006.01)
*H01L 31/113* (2006.01)
*H01L 27/148* (2006.01)
*H01L 27/00* (2006.01)

(52) U.S. Cl. .................... 348/308; 257/291; 257/215; 250/208.1; 348/296

(58) Field of Classification Search ................. 348/294, 348/296, 302, 308, 362, 297; 250/208.1
See application file for complete search history.

(56) References Cited

U.S. PATENT DOCUMENTS

| | | | |
|---|---|---|---|
| 5,324,944 A * | 6/1994 | Soch et al. ............... 250/338.3 |
| 5,541,654 A * | 7/1996 | Roberts ....................... 348/302 |
| 6,175,383 B1 * | 1/2001 | Yadid-Pecht et al. ........ 348/302 |
| 6,466,266 B1 * | 10/2002 | Guidash et al. ............. 348/308 |
| 6,515,701 B1 * | 2/2003 | Clark et al. ................. 348/308 |
| 6,515,702 B1 * | 2/2003 | Yadid-Pecht et al. ........ 348/302 |
| 6,529,242 B1 * | 3/2003 | Panicacci .................... 348/308 |
| 6,549,234 B1 * | 4/2003 | Lee ............................ 348/297 |
| 6,570,617 B1 * | 5/2003 | Fossum et al. ............. 348/294 |
| 6,798,451 B1 * | 9/2004 | Suzuki et al. ............... 348/294 |

* cited by examiner

*Primary Examiner*—David Ometz
*Assistant Examiner*—Nhan Tran
(74) *Attorney, Agent, or Firm*—Frommer Lawrence & Haug LLP; William S. Frommer; Thomas F. Presson

(57) ABSTRACT

In an X-Y address imaging device having an electronic shutter function, a vertical driving section includes a vertical scanning circuit and a vertical shutter scanning circuit. A horizontal driving section includes a horizontal scanning circuit and a horizontal shutter scanning circuit. The horizontal shutter scanning circuit selects, on a pixel basis, a pixel for which to perform a shutter operation from the pixels of a read pixel row selected by the vertical scanning section. After a lapse of an exposure time that is an integral multiple of a one-pixel selection period, a signal of the selected pixel is read out by scanning by the horizontal scanning circuit. This realizes an electronic shutter that enables not only an exposure time that is an integral multiple of 1H but also an exposure time having a time shorter than 1H as a unit.

12 Claims, 6 Drawing Sheets

FIG.3
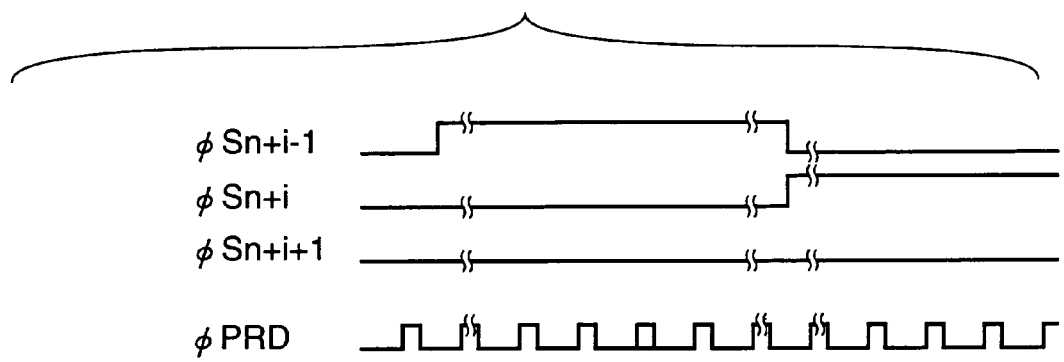
SHUTTER SELECTION
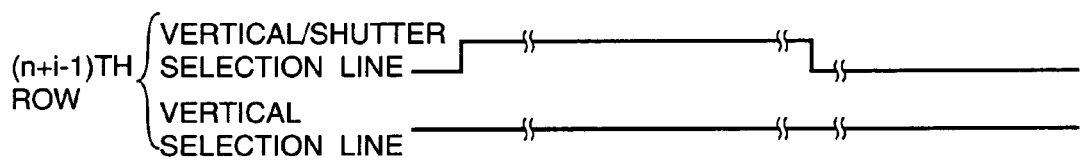
VERTICAL SELECTION
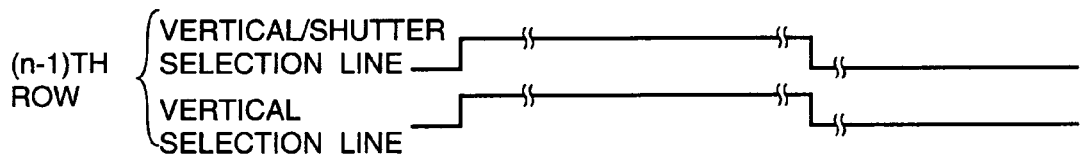
HORIZONTAL SELECTION
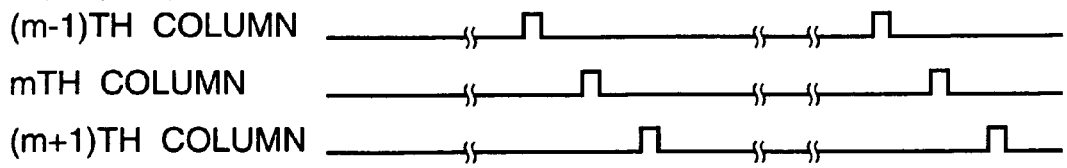
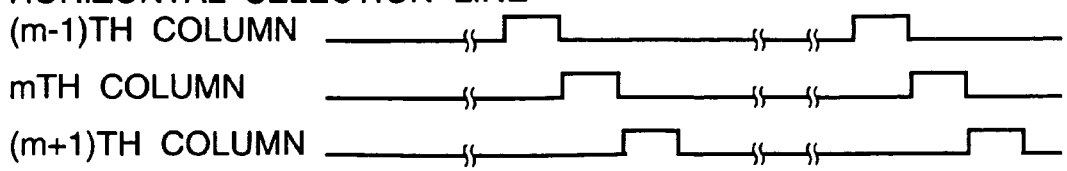

SOLID-STATE IMAGING DEVICE, ITS DRIVING METHOD, AND CAMERA SYSTEM

BACKGROUND OF THE INVENTION

1. Field of the Invention

The present invention relates to a solid-state imaging device, its driving method, and a camera system. In particular, the invention relates to an X-Y address solid-state imaging device having an electronic shutter function, its driving method, and a camera system using such a solid-state imaging device.

2. Description of the Related Art

In X-Y address imaging devices having an electronic shutter function, the shutter is released line by line, which is in contrast to the case of CCD (charge coupled device) imaging devices having an electronic shutter function. In CCD imaging devices, it is not necessary to release the shutter line by line because signal charges of respective pixels are read into a vertical transfer section at one time. In contrast, in X-Y address imaging devices, the shutter is released line by line because signals of respective pixels are read out on a line-by-line basis.

Therefore, conventional X-Y address imaging devices are provided with an electronic shutter scanning circuit in a vertical scanning section. However, since the vertical scanning section scans the lines every 1H (H: horizontal scanning period), settable exposure times (i.e., shutter speeds) are limited to integral multiples of 1H; that is, an electronic shutter having a unit exposure time that is shorter than 1H has not been realized yet.

SUMMARY OF THE INVENTION

The present invention has been made in view of the above problem in the art, and an object of the invention is therefore to provide a solid-state imaging device capable of performing an electronic shutter operation with a unit exposure time that is shorter than 1H, its driving method, and a camera system using such a solid-state imaging device.

The invention provides a solid-state imaging device comprising a pixel section in which unit pixels are arranged in matrix form and a signal of each pixel is output as an electrical signal; a vertical driving section including a vertical scanning circuit for selecting, on a row basis, pixels from which to read out signals, and a vertical shutter scanning circuit for selecting, on a row basis, pixels for which to perform a shutter operation prior to the selection of a read pixel row by the vertical scanning circuit; and a horizontal scanning section including a horizontal scanning circuit for sequentially selecting the pixels of the read pixel row selected by the vertical scanning circuit and a shutter pixel row selected by the vertical shutter scanning circuit, and a horizontal shutter scanning circuit for selecting, on a pixel basis, a pixel for which to perform a shutter operation prior to the pixel selection by the horizontal scanning circuit. The solid-state imaging device having the above configuration is used in a camera system.

In the above configuration, each of the vertical scanning circuit and the vertical shutter scanning circuit selects pixels on a row basis in which the vertical shutter scanning circuit selects a read pixel row at a time point preceding selection of the read pixel row by the vertical scanning circuit by a time corresponding to a prescribed number of pixels. Each of the horizontal scanning circuit and the horizontal shutter scanning circuit selects pixels on a pixel basis in which the horizontal shutter scanning circuit selects a shutter pixel at a time point preceding pixel selection by the horizontal scanning circuit by a time corresponding to a prescribed number of pixels. The time corresponding to the prescribed number of pixels is an exposure time.

That is, pixels for which a shutter operation is to be performed are selected on a row basis, the row of those pixels is selected as a read pixel row from which to read pixel signals after a lapse of an exposure time that is an integral multiple of a one-row selection period, a pixel for which to perform a shutter operation is selected on a pixel basis from the pixels of the selected read pixel row, and a signal of the selected pixel is read out after a lapse of an exposure time that is an integral multiple of a one-pixel selection period. This makes it possible to set not only an exposure time that is an integral multiple of 1H but also an exposure time having, as a unit, a time shorter than 1H, that is, a one-pixel selection period.

BRIEF DESCRIPTION OF THE DRAWINGS

FIG. 3 is a timing chart of an electronic shutter operation caused by a vertical shutter scanning circuit;

DETAILED DESCRIPTION OF THE PREFERRED EMBODIMENTS

Embodiments of the present invention will be hereinafter described in detail with reference to the accompanying drawings.

Figure 1:
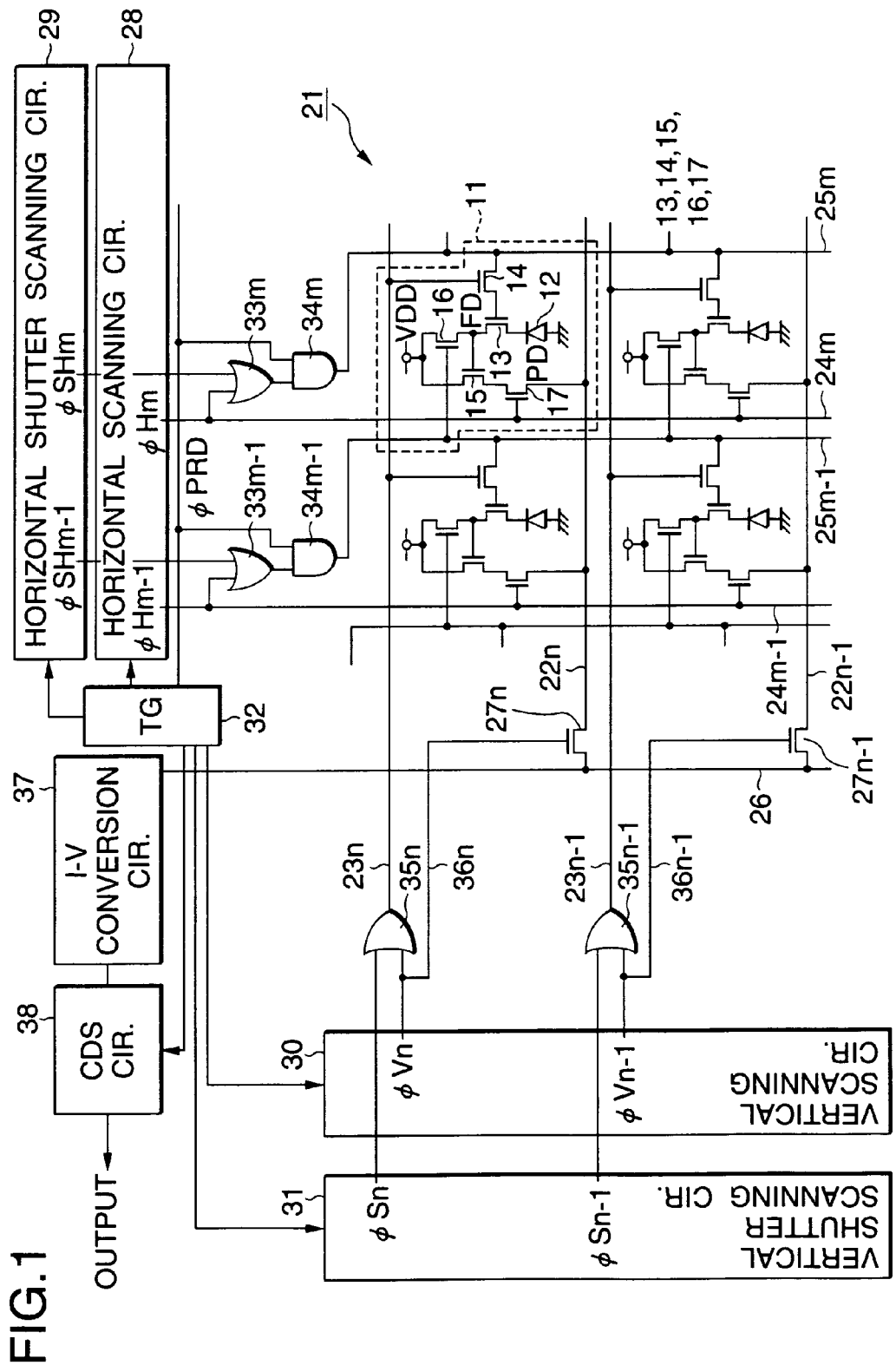
FIG. 1 schematically shows the configuration of a solid-state imaging device according to an embodiment of the present invention.

FIG. 1 schematically shows the configuration of a solid-state imaging device according to an embodiment of the invention. The solid-state imaging device according to this embodiment is an X-Y address imaging device having an electronic shutter function.

In FIG. 1, the region enclosed by a broken line is a unit pixel 11. Each unit pixel 11 consists of a photodiode (PD) 12 as a photoelectric conversion element and five N-channel MOS transistors that are a read transistor 13, a read selection transistor 14, an amplification transistor 15, a reset transistor 16, and an output selection transistor 17. A pixel section 21 is formed by the matrix-arranged unit pixels 11.

To simplify the drawing, FIG. 1 shows an example in which the pixel section 21 has a pixel structure of two columns (an (m−1)th column and an mth column) and two rows (an (n−1)th row and an nth row). In the pixel section 21, horizontal signal lines $22n-1$ and $22n$ and vertical/shutter scanning lines $23n-1$ and $23n$ are arranged on a row-by-row basis. Further, horizontal selection lines $24m-1$ and $24m$ and read/reset lines $25m-1$ and $25m$ are arranged on a column-by-column basis.

In the mth-column/nth-row unit pixel 11, the photodiode 12 has both functions of photoelectric conversion and charge accumulation. That is, the photodiode 12 has a function of photoelectrically converting incident light into a signal charge of a charge amount corresponding to the light quantity of the incident light and accumulating the signal charge. The photodiode 12 has a buried diode sensor structure, for example, a HAD (hole accumulated diode) sensor structure in which a $p^+$ hole accumulation layer is added to an np diode on the substrate surface side.

The source of the read transistor 13 is connected to the cathode of the photodiode 12. The drain of the read transistor 13 is connected to a floating diffusion region FD and its gate is connected to the source or drain of the read selection transistor 14. The drain or source of the read selection transistor 14 is connected to the read/reset line 25m and its gate is connected to the vertical/shutter selection line 23m. The gate of the amplification transistor 15 is connected to the floating diffusion region FD and its drain is connected to a power source VDD.

The source, drain, and gate of the reset transistor 16 are connected to the floating diffusion region FD, the power source VDD, and the adjacent (m−1)th read/reset line 25m−1, respectively. The reset transistor 16 is of a depletion type to enable resetting of the voltage of the floating diffusion region FD to the power source voltage VDD. The drain, source, and gate of the output selection transistor 17 are connected to the source of the amplification transistor 15, the horizontal signal line 22n, and the horizontal selection line 24m, respectively.

A single vertical signal line 26 is provided for the plural rows of horizontal signal lines (in this example, the two rows horizontal signal lines 22n−1 and 22n) in the direction perpendicular to those horizontal signal lines. Vertical selection transistors 27n−1 and 27n are provided between and connected to the vertical signal line 26 and the horizontal signal lines 22n−1 and 22n, respectively. The vertical selection transistors 27n−1 and 27n are also N-channel MOS transistors.

A horizontal scanning circuit 28 for column selection and horizontal shutter scanning circuit 29 for controlling an accumulation time (exposure time) that is an integral multiple of a 1-bit period are provided as a peripheral section of the pixel section 21, that is, as a horizontal driving section. A vertical scanning circuit 30 for row selection and a vertical shutter scanning circuit 31 for controlling an accumulation time that is an integral multiple of 1H (H: horizontal scanning period) are provided as another peripheral section of the pixel section 21, that is, as a vertical driving section. The 1-bit period means a selection period of one pixel.

Each of the horizontal scanning circuit 28, the horizontal shutter scanning circuit 29, the vertical scanning circuit 30, and the vertical shutter scanning circuit 31 is a shift register, for example, and starts a shift operation (a scan) in response to a drive pulse that is supplied from a timing generator (TG) 32.

The horizontal scanning circuit 28 sequentially outputs horizontal scanning (selection) pulses φHm−1 and φHm, and the horizontal shutter scanning circuit 29 sequentially outputs horizontal shutter pulses φSHm−1 and φSHm. Each of the horizontal scanning pulses φHm−1 and φHm is supplied to the gates of the output selection transistors 17 of the unit pixels 11 of the corresponding column via the horizontal selection lines 24m−1 or 24m as well as supplied, as one input, to the corresponding one of OR gates 33m−1 and 33m that are provided for the respective columns. The horizontal shutter pulses φSHm−1 and φSHm are supplied to the OR gates 33m−1 and 33m as the other inputs, respectively.

Outputs of the OR gates 33m−1 and 33m are supplied, as one input, to AND gates 34m−1 and 34m, respectively, that are provided for the respective columns. A read pulse φPRD that is output from the timing generator 32 is supplied to the AND gates 34m−1 and 34m as the other inputs.

An output of each of the AND gates 34m−1 and 34m is supplied to the drains or sources of the read selection transistors 14 of the unit pixels 11 of the corresponding column via the read/reset line 25m−1 or 25m, as well as supplied to the gates of the reset transistors 16 of the unit pixels 11 of an adjacent column.

The vertical scanning circuit 30 sequentially outputs vertical scanning pulses φVn−1 and φVn, and the vertical shutter scanning circuit 31 sequentially outputs vertical shutter pulses φSn−1 and φSn. The vertical scanning pulses φVn−1 and φVn are supplied, as one input, to OR gates 35n−1 and 35n that are provided for the respective columns as well as supplied to the gates of the vertical selection transistors 27n−1 and 27n via the vertical selection lines 36n−1 and 36n.

The vertical shutter pulses φSn−1 and φSn are supplied to the OR gates 35n−1 and 35n as the other inputs. Each of outputs of the OR gates 35n−1 and 35n is supplied to the gates of the read selection transistors 14 of the unit pixels 11 of the corresponding row via the vertical/shutter selection line 23m−1 or 23m.

An I (current)-V (voltage) conversion circuit 37 and a difference circuit such as a correlated double sampling circuit (hereinafter abbreviated as CDS) 38 are provided on the output side of the vertical signal line 26. The I-V conversion circuit 37 converts a pixel signal that is supplied via the vertical signal line 26 as a signal current into a signal voltage, and supplies it to the CDS circuit 38.

The CDS circuit 38 calculates the difference between the noise level and the signal level immediately after pixel resetting based on a sampling pulse that is supplied from the timing generator 32. It is possible to provide, when necessary, an AGC (automatic gain control) circuit, an ADC (analog-to-digital converter) circuit, or the like downstream of the CDS circuit 38.

Figure 2:
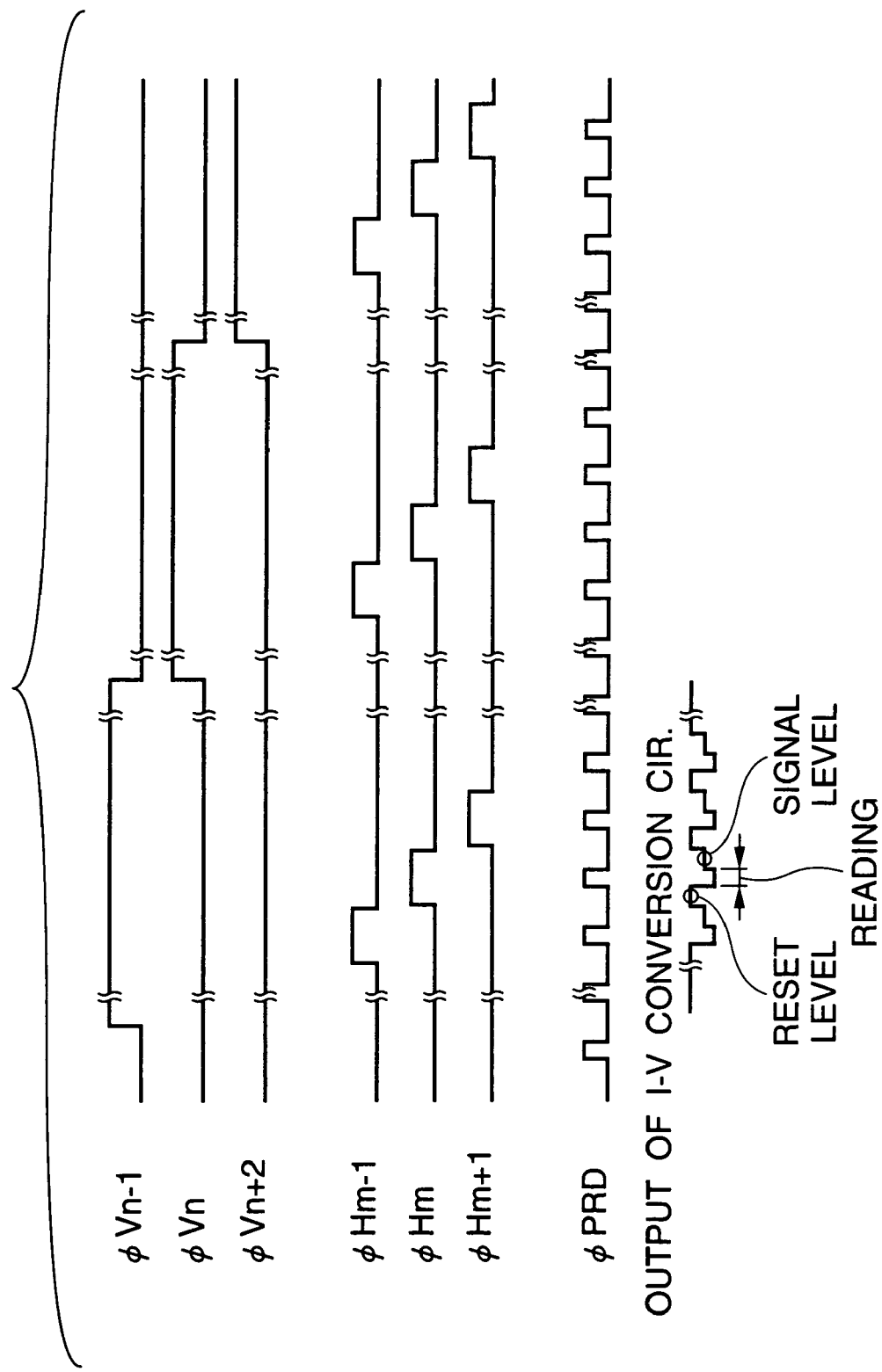
FIG. 2 is a timing chart of a case where no electronic shutter operation is performed.
Figure 4:
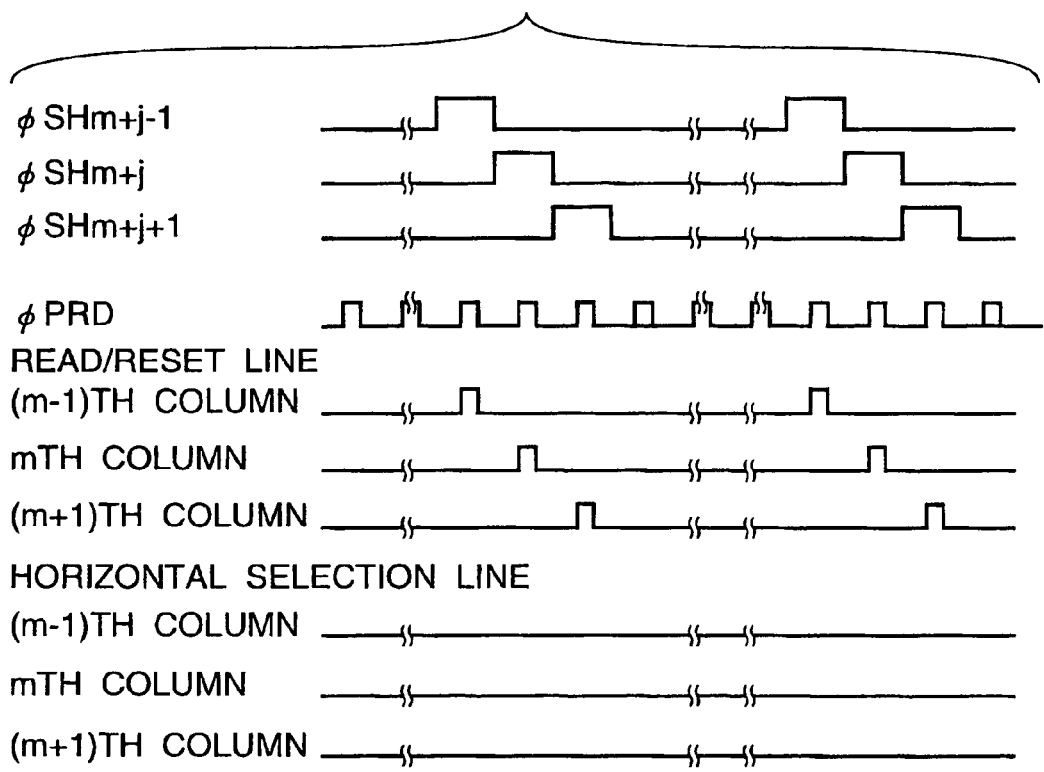
FIG. 4 is a timing chart of an electronic shutter operation caused by a horizontal shutter scanning circuit.

The operation of the X-Y address imaging device having the above configuration will be described below with reference to timing charts of FIGS. 2–4. FIG. 2 is a timing chart of a case where no electronic shutter operation is performed. FIG. 3 is a timing chart of an electronic shutter operation caused by the vertical shutter scanning circuit 31. FIG. 4 is a timing chart of an electronic shutter operation caused by the horizontal shutter scanning circuit 29.

The case where no electronic shutter operation is performed will be described below with reference to the timing chart of FIG. 2 with attention paid to the mth-column/(n−1)th-row pixel. By vertical scanning by the vertical scanning circuit 30, a vertical scanning pulse φVn−1 is output from the vertical scanning circuit 30. The vertical scanning pulse φVn−1 is applied to the gate of the (n−1)th-row vertical selection transistor 27n−1 via the vertical selection line 36n−1 as well as applied to the nth-row vertical/shutter selection line 23n−1 via the OR gate 35n−1. As a result, the (n−1)th row is selected as a read row.

In a state that the (n−1)th row is selected, by horizontal scanning by the horizontal scanning circuit 28, a horizontal scanning pulse φHm−1 is output from the horizontal scanning circuit 28. If a read pulse φPRD is output from the timing generator 32 while the horizontal scanning pulse φHm−1 is generated, the read pulse φPRD is ANDed with the horizontal scanning pulse φHm−1 by the AND gate 34m−1, whereby a pulse occurs on the (m−1)th-column read/reset line 25m−1.

In response, the reset transistor 16 of the mth-column/(n−1)th-row pixel (hereinafter written as pixel (m, n−1)) is turned on. As a result, the voltage of the floating diffusion region FD is reset to the power source voltage VDD via the reset transistor 16. At this time, the horizontal scanning pulse φHm−1 for the (m−1)th column serves as a reset pulse for the adjacent, mth-column unit pixel 11.

Then, when a horizontal scanning pulse φHm is output from the horizontal scanning circuit 28 and applied to the mth-row horizontal selection line 24m, the output selection transistor 17 of the pixel (m, n−1) is turned on. As a result, a current corresponding to a reset level of the reset pixel (m, n−1) is output to the vertical signal line 26 via the horizontal signal line 22n−1 and the vertical selection transistor 27n−1.

If a read pulse φPRD is output while the horizontal scanning pulse φHm is generated, the read pulse φPRD is ANDed with the horizontal scanning pulse φHm by the AND gate 34m, whereby a pulse occurs on the mth-column read/reset line 25m. At this time, the read selection transistor 14 of the pixel (m, n−1) is on because the vertical scanning pulse φVn−1 is applied to its gate.

Therefore, the pulse that has occurred on the read/reset line 25m, that is, the read pulse φPRD, is applied to the gate of the read transistor 13 via the drain and source of the read selection transistor 14. As a result, the read transistor 13 is turned on and a signal charge that has been generated in the photodiode 12 through photoelectric conversion and accumulated there is read into the floating diffusion region FD via the read transistor 13.

When the read pulse φPRD disappears, the read transistor 13 is turned off. The signal charge that has been read into the floating diffusion region FD is amplified by the amplification transistor 15 into a signal current corresponding to the charge amount. The signal current is output to the vertical signal line 26 via the output selection transistor 17, the horizontal signal line 22n−1, and the vertical selection transistor 27n−1.

When the pixel (m, n−1) is selected, the pixel (m+1, n−1) of the next column is reset by the horizontal scanning pulse φHm. When the horizontal scanning pulse φHm disappears and a horizontal scanning pulse φHm+1 is output from the horizontal scanning circuit 28, the pixel (m+1, n−1) of the next column is selected.

As the above series of operations is repeated, reset levels and signal levels of the unit pixels 11 of one line ((n−1)th row) are read into the vertical signal line 26 in a point sequential manner along the same route (the horizontal signal line 22n−1, the vertical selection transistor 27n−1, etc.). They are converted from currents into voltages by the I-V conversion circuit 37 and then supplied to the CDS circuit 38, where they are subjected to noise cancellation by correlated double sampling.

Next, the electronic shutter operation caused by the vertical shutter scanning circuit 31 will be described with reference to the timing chart of FIG. 3 for an example case where the (n+i−1)th row is made a shutter pixel and the (n−1)th row is made a selection pixel row (signal read pixel row). In this case, the accumulation time amounts to 1H×i.

By scanning by the vertical shutter scanning circuit 31, a shutter pulse φSn+i−1 is output and applied to the nth-row vertical/shutter selection line 23n+i−1 via the OR gate 35n+i−1. As a result, the (n+i−1)th row is selected as a shutter row. At this time, no pulse occurs on the (n+i−1)th-row vertical selection line 36n+i−1.

At this time, a vertical scanning pulse φVn−1 is output from the vertical scanning circuit 30. The vertical scanning pulse φVn−1 is applied to the gate of the (n−1)th-row vertical selection transistor 27n−1 via the vertical selection line 36n−1 as well as applied to the (n−1)th-row vertical/shutter selection line 23n−1 via the OR gate 35n−1. As a result, the (n−1)th row is selected as a read row.

In this state, by horizontal scanning by the horizontal scanning circuit 28, a horizontal scanning pulse φHm−1 is output from the horizontal scanning circuit 28. If a read pulse φPRD is output from the timing generator 32 while the horizontal scanning pulse φHm−1 is generated, the read pulse φPRD is ANDed with the horizontal scanning pulse φHm−1 by the AND gate 34m−1. As a result, a pulse occurs on the (m−1)th-column read/reset line 25m−1.

In response, the reset transistors 16 of the pixels (m, n+i−1) and (m, n−1) are turned on. As a result, the voltage of the floating diffusion region FD of each of these pixels is reset to the power source voltage VDD via the reset transistor 16.

Subsequently, a horizontal scanning pulse φHm is output from the horizontal scanning circuit 28. When the horizontal scanning pulse φHm is applied to the mth-column horizontal selection line 24m, the output selection transistors 17 of the pixels (m, n+i−1) and (m, n−1) are turned on. As a result, a current corresponding to a reset level of the pixel (m, n−1) of the read pixel row is output to the vertical signal line 26 via the horizontal signal line 22n−1 and the vertical selection transistor 27n−1.

At this time, as for the pixel (m, n+i−1), a current corresponding to a reset level is not output to the vertical signal line 26 because the (n+i−1)th-row vertical selection transistor 27n+i−1 is off.

If a read pulse φPRD is output while the horizontal scanning pulse φHm is generated, the read pulse φPRD is ANDed with the horizontal scanning pulse φHm by the AND gate 34m, whereby a pulse occurs on the mth-column read/reset line 25m. This pulse, that is, the read pulse φPRD, is applied to the gates of the read transistors 13 of the pixels (m, n+i−1) and (m, n−1) via the drains and sources of the read selection transistors 14. As a result, the read transistors 13 are turned on and signal charges that have been generated in the photodiodes 12 through photoelectric conversion and accumulated there are read into the floating diffusion regions FD via the read transistors 13.

When the read pulse φPRD disappears, the read transistors 13 of the pixels (m, n+i−1) and (m, n−1) are turned off. The signal charge that has been read into the floating diffusion region FD of the pixel (m, n−1) of the read pixel row is amplified by the amplification transistor 15 into a signal current corresponding to the charge amount. The signal current is output to the vertical signal line 26 via the output selection transistor 17, the horizontal signal line 22n−1, and the vertical selection transistor 27n−1.

At this time, as for the pixel (m, n+i−1) of the shutter pixel row, a current corresponding to the charge amount of the signal charge is not output to the vertical signal line 26 because the(n+i−1)th-row vertical selection transistor 27n+i−1 is off. The signal charge that has been accumulated in the photodiode 12 of the pixel (m, n+i−1) is sent to the floating diffusion region FD, as a result of which the photodiode 12 becomes empty and charge accumulation is newly started.

When the pixel (m, n−1) is selected, the pixel (m+1, n−1) of the next column is reset by the horizontal scanning pulse φHm. When the horizontal scanning pulse φHm disappears and a horizontal scanning pulse φHm+1 is output from the horizontal scanning circuit 28, the pixel (m+1, n−1) of the next column is selected. At a time point when a time 1H×i has elapsed from the selection of the pixel (m, n−1), the pixel (m, n+i−1) is selected. Therefore, the accumulation time (exposure time, i.e., shutter speed) of the pixel (m, n+i−1) amounts to 1H×i.

Also in this electronic shutter operation, as in the case where no electronic shutter operation is performed, reset levels and signal levels of the unit pixels 11 of one line ((n−1)th row) are read into the vertical signal line 26 along the same route in a point sequential manner. They are converted from currents to voltages by the I-V conversion circuit 37 and then sent to the CDS circuit 38, where they are subjected to noise cancellation by correlated double sampling.

Next, the electronic shutter operation caused by the horizontal shutter scanning circuit 29 will be described with reference to the timing chart of FIG. 4 for an example case where the pixel (m+j−1, n−1) is made a shutter pixel and the pixel (m−1, n−1) is made a selection pixel (signal read pixel). In this case, the accumulation time amounts to one-pixel selection period (1-bit period)×j.

First, by vertical scanning by the vertical scanning circuit 30, a vertical scanning pulse φVn−1 is output from the scanning circuit 30. It is assumed that the vertical scanning pulse φVn−1 is applied to the gate of the (n−1)th-row vertical selection transistor 27n−1 via the vertical selection line 36n−1 as well as applied to the (n−1)th-row vertical/shutter selection line 23n−1 via the OR gate 35n−1, whereby the (n−1)th row is selected.

In the state that the (n−1)th row is selected, a horizontal scanning pulse φHm−2 is output from the horizontal scanning circuit 28 by horizontal scanning by the horizontal scanning circuit 28. If a read pulse φPRD is output from the timing generator 32 while the horizontal scanning pulse φHm−2 is generated, the read pulse φPRD is ANDed with the horizontal scanning pulse φHm−2 by the AND gate 34m−2, whereby a pulse occurs on the (m−2)th-column read/reset line 25m−2.

In response, the reset transistor 16 of the pixel (m−1, n−1) is turned on. As a result, in the pixel (m−1, n−1), the voltage of the floating diffusion region FD is reset to the power source voltage VDD via the reset transistor 16. At the same time, by scanning by the horizontal shutter scanning circuit 29, a horizontal shutter pulse φSHm+j−2 is output from the horizontal shutter scanning circuit 29. If a read pulse φPRD is output while the horizontal shutter pulse φSHm+j−2 is generated, a pulse occurs on the (m+j−2)th-column read/reset line 25m+j−2. As a result, the reset transistor 16 of the pixel (m+j−1, n−1) is turned on and the voltage of the floating diffusion region FD is reset to the power source voltage VDD via the reset transistor 16.

Then, when a horizontal scanning pulse φHm−1 is output from the horizontal scanning circuit 28 and applied to the (m−1)th-column horizontal selection line 24m−1, the output selection transistor 17 of the reset pixel (m−1, n−1) is turned on. As a result, a current corresponding to a reset level of the pixel (m−1, n−1) is output to the vertical signal line 26 via the horizontal signal line 22n−1 and the vertical selection transistor 27n−1.

At this time, as for the pixel (m+j−1, n−1), a current corresponding to a reset level is not output to the vertical signal line 26 because the (m+j−1)th-column output selection transistors 17 are off.

If a read pulse φPRD is output while the horizontal scanning pulse φHm−1 is generated, the read pulse φPRD is ANDed with the horizontal scanning pulse φHm−1 by the AND gate 34m−1, whereby a pulse occurs on the (m−1)th-column read/reset line 25m−1. This pulse, that is, the read pulse φPRD, is applied to the gate of the read transistor 13 via the drain and source of the read selection transistor 14 of the pixel (m−1, n−1). As a result, the read transistor 13 is turned on and a signal charge that has been generated in the photodiode 12 through photoelectric conversion and accumulated there is read into the floating diffusion region FD via the read transistor 13.

At the same time, a horizontal shutter pulse φSHm+j−1 which is output from the horizontal shutter scanning circuit 29 and the read pulse φPRD are ANDed by the AND gate 34m+j−1, whereby a pulse occurs on the (m+j−1)th-column read/reset line 25m+j−1. This pulse is applied to the gate of the read transistor 13 via the drain and source of the read selection transistor 14 of the pixel (m+j−1, n−1). As a result, the read transistor 13 is turned on and a signal charge that has been generated in the photodiode 12 through photoelectric conversion and accumulated there is read into the floating diffusion region FD via the read transistor 13.

When the read pulse φPRD disappears, the read transistors 13 of the pixels (m+j−1, n−1) and (m−1, n−1) are turned off. The signal charge that has been read into the floating diffusion region FD of the pixel (m−1, n−1) is amplified by the amplification transistor 15 into a signal current corresponding to the charge amount. The signal current is output to the vertical signal line 26 via the output selection transistor 17, the horizontal signal line 22n−1, and the vertical selection transistor 27n−1.

At this time, as for the pixel (m+j−1, n−1), a current corresponding to the charge amount of the signal charge is not output to the vertical signal line 26 because the output selection transistors 17 of the (m+j−1)th-column pixels are off. The signal charge that has been accumulated in the photodiode 12 of the pixel (m+j−1, n−1) is sent to the floating diffusion region FD, as a result of which the photodiode 12 becomes empty and charge accumulation is newly started.

When the horizontal scanning pulse φHm−1 disappears and a horizontal scanning pulse φHm is output from the horizontal scanning circuit 28, the pixel (m+1, n−1) is rendered in a non-selected state and the pixel (m, n−1) of the next column is selected. At a time point when a time (1-bit period)×j has elapsed from the selection of the pixel (m−1, n−1), the pixel (m+j−1, n−1) is selected. Therefore, the accumulation time (exposure time, i.e., shutter speed) of the pixel (m−1, n−1) amounts to (1-bit period)×j and an electronic shutter having a shorter accumulation time than 1H is thus enabled.

Incidentally, where an electronic shutter is realized by the horizontal shutter scanning circuit 29, a phase deviation of 1H occurs between the horizontal shutter scanning circuit 29 and the horizontal scanning circuit 28. This phase deviation problem can be solved by driving the vertical shutter scanning circuit 31 with the phase of the horizontal shutter circuit 29 and driving the vertical scanning circuit 30 with the phase of the horizontal scanning circuit 28.

Figure 5:
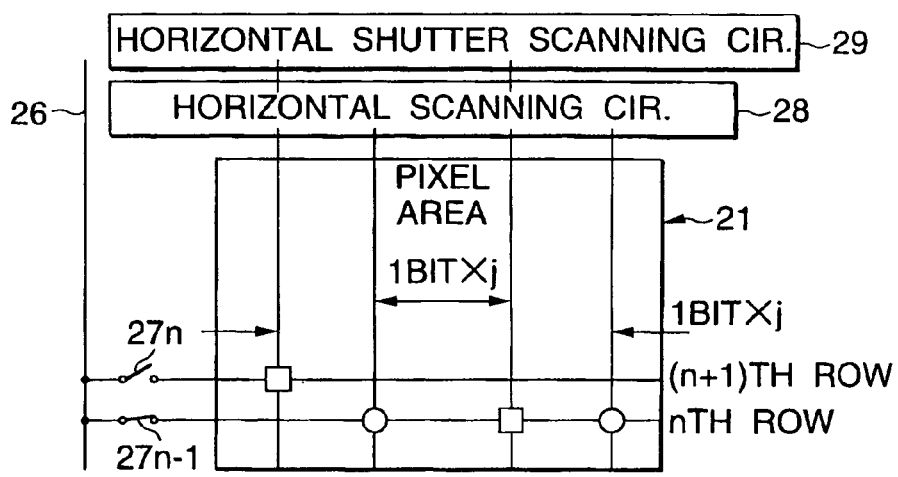
FIG. 5 schematically shows electronic shutter driving by the horizontal shutter scanning circuit.
Figure 6:
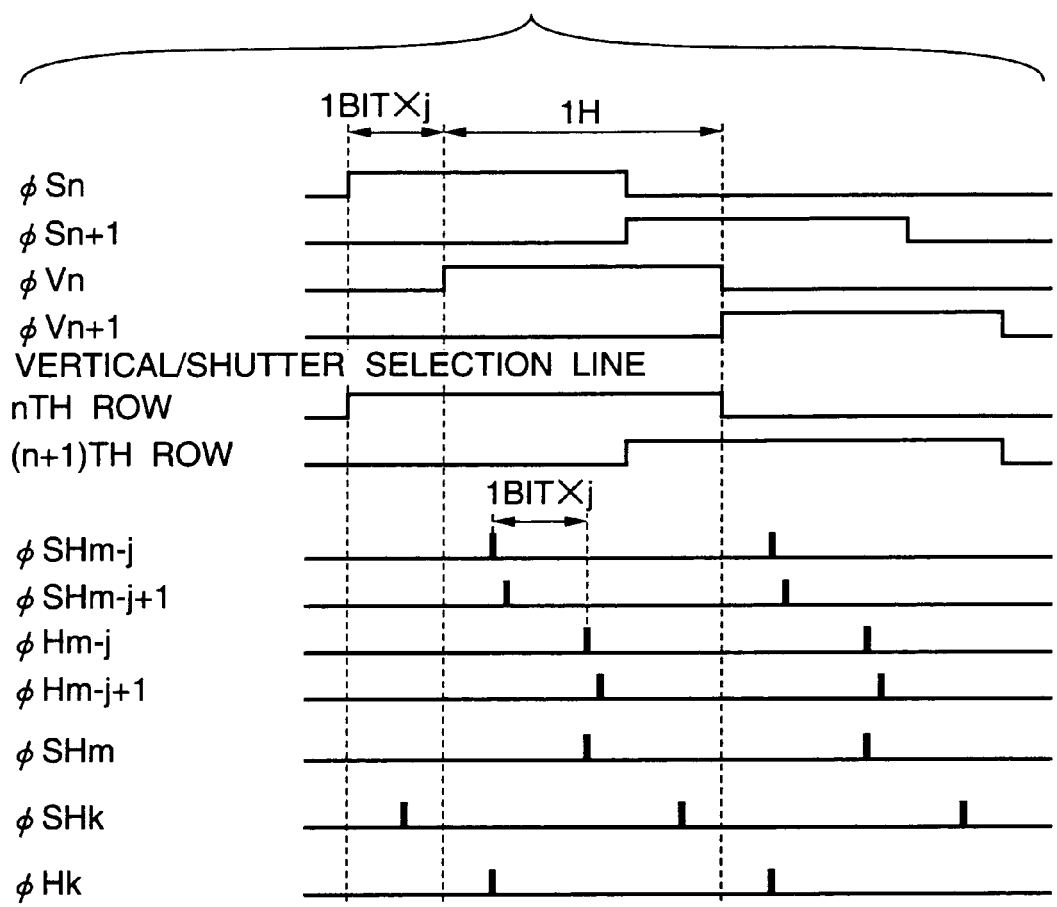
FIG. 6 is a timing chart of the electronic shutter driving by the horizontal shutter scanning circuit.

The principle of the above driving scheme will be described below with reference to FIGS. 5 and 6. FIG. 5 schematically shows electronic shutter driving by the horizontal shutter scanning circuit 29, and FIG. 6 is its timing chart.

By scanning by the vertical shutter scanning circuit 31, a vertical shutter pulse φSn is output from the vertical shutter scanning circuit 31 and applied to the nth-row vertical/shutter selection line 23n via the OR gate 35n, whereby the nth row is selected. In this state, by scanning by the horizontal shutter scanning circuit 29, horizontal shutter pulses . . . , φSHm−1, φSHm, . . . are sequentially output from the horizontal shutter scanning circuit 29 and applied to the read/reset lines . . . . 25m−1, 25m, . . . of the respective columns as shutter read pulses.

After a lapse of an electronic shutter set accumulation time ((1-bit period)×j), by horizontal scanning by the horizontal scanning circuit 28, horizontal scanning pulses . . . , φHm−1, φHm, . . . are applied to the horizontal selection lines . . . , 24m−1, 24m, . . . of the respective columns from the horizontal scanning circuit 28, whereby the nth-row pixels start to be selected.

Even when the scanning by the horizontal shutter scanning circuit 29 reaches the last bit, the horizontal scanning by the horizontal scanning circuit 28 is still in a state that a bit that is j-bit before the last bit is selected. If in this state the vertical shutter pulse φSn disappears and instead a vertical shutter pulse φSn+1 is output from the vertical shutter scanning circuit 31, the (n+1)th row is selected.

At this time, although the vertical shutter pulse φSn disappears, the vertical scanning pulse φVn is still output from the vertical scanning circuit 30 and hence the potential of the nth-row vertical/shutter selection line 23n is kept at a high level. In this period, the pixels of two rows, that is, the nth-row pixels (1, n), (2, n), . . . and the (n+1)th-row pixels (1, n+1), (2, n+1), . . . , are selected. However, since the horizontal selection in the nth-row is performed on the jth bit and the following bits, the selection of the pixels (1, n) to (j−1, n) has already been finished.

Therefore, no problems occur even if signal charges accumulated in the photodiodes 12 of the pixels (1, n) to (j−1, n) are read out at this time point. As for the pixels (1, n) to (j−1, n), no pixel signals are output to the horizontal signal line 22n because the output selection transistors 17 are off.

As described above, the horizontal shutter scanning circuit 29 is provided in the horizontal scanning section and the vertical scanning circuit 30 and the vertical shutter scanning circuit 31 are caused to operate with drive timing of different phases. This measure makes it possible to release the shutter not only on a line basis but also on a pixel basis, which enables an electronic shutter having a unit accumulation time (exposure time, i.e., shutter speed) that is shorter than 1H.

Figure 7:
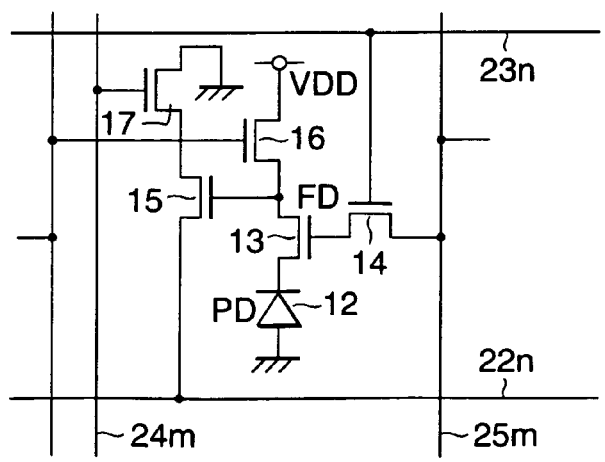
FIG. 7 is a circuit diagram showing a pixel configuration according to a modification of the embodiment.

In the above embodiment, each unit pixel 11 is configured in such a manner that the drain of the amplification transistor 15 is connected to the power source VDD and its source is connected to the horizontal signal line 22n via the output selection transistor 17. However, a configuration shown in FIG. 7 in which the drain of the amplification transistor 15 is connected to the horizontal signal line 22n and its source is connected to the ground GND via the output selection transistor 17 is possible depending on the configuration of the I-V conversion circuit 37.

Figure 8:
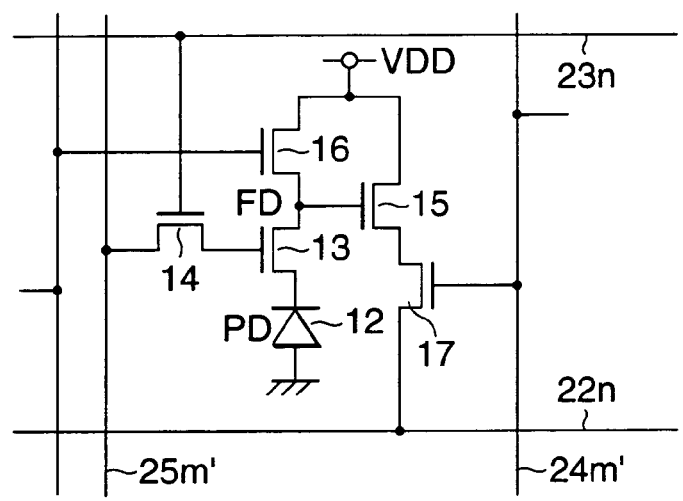
FIG. 8 is a circuit diagram showing a pixel configuration according to another modification of the embodiment.

Although in the above embodiment the read/reset line 25m serves as both of a read line and a reset line, a configuration shown in FIG. 8 is possible in which a horizontal selection/reset line 24m' is provided so as to serve as both of a horizontal selection line and a reset line and an independent read line 25m' is provided. Also in this case, the mutual connections among the five transistors 13–17 in each unit pixel 11 remain the same as in the above embodiment and the same operations are performed with the same driving timing as in the above embodiment.

Figure 9:
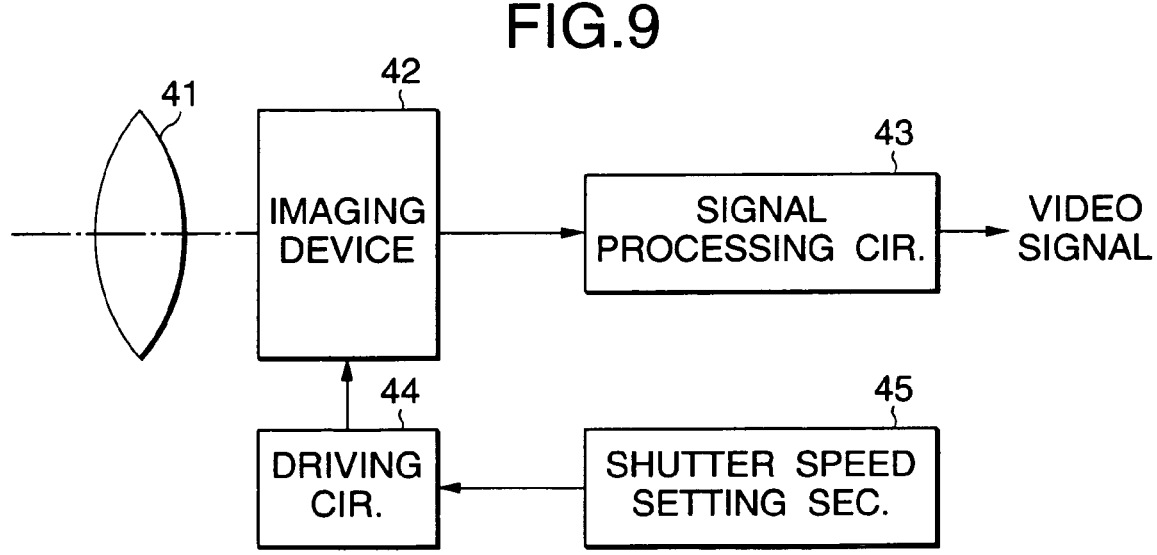
FIG. 9 is a block diagram schematically showing the configuration of a camera system according to the invention.

FIG. 9 is a block diagram schematically showing the configuration of a camera system according to the invention. As shown in FIG. 9, incident light (image light) coming from an object (not shown) is imaged on the imaging surface of an imaging device 42 via an optical system including a lens 41. The above-configured X-Y address imaging device having an electronic shutter function is used as the imaging device 42. An output signal of the imaging device 42 is output as a video signal after being subjected to various kinds of signal processing in a signal processing circuit 43.

The imaging device 42 is driven by a driving circuit 44 including the above-mentioned timing generator (TG) 32 (see FIG. 1). The driving circuit 44 is given pieces of information i and j relating to a shutter speed (exposure time, i.e., accumulation time) that are set in a shutter speed setting section 45. The shutter speed setting section 45 sets the information i that determines an accumulation time that is 1H multiplied by an integer i and the information j that determines an accumulation time that is a 1-bit period multiplied by an integer j.

In this camera system, the X-Y address imaging device that has the shutter scanning circuit (see FIG. 1) not only in the vertical driving section but also in the horizontal driving section is employed as the imaging device 42 and the shutter speed setting section 45 can arbitrarily set pieces of information i and j relating to an exposure time (accumulation time). Therefore, though the imaging device 42 is an X-Y address imaging device, the shutter speed can be set finely in a unit that is shorter than 1H.

As described above, according to the invention, in the solid-state imaging device having an electronic shutter function and the camera system using it, pixels for which a shutter operation is to be performed are selected on a row basis, the row of those pixels is selected as a read pixel row from which to read pixel signals after a lapse of an exposure time that is an integral multiple of 1H, a pixel for which to perform a shutter operation is selected on a pixel basis from the pixels of the selected read pixel row, and a signal of the selected pixel is read out after a lapse of an exposure time that is an integral multiple of a 1-bit period. This enables not only an electronic shutter operation with an exposure time that is an integral multiple of 1H but also an electronic shutter operation with an exposure time having a time shorter than 1H as a unit.

What is claimed is:

1. A solid-state imaging device comprising:
a pixel section in which unit pixels are arranged in matrix form and a signal of each pixel is output as an electrical signal;
a vertical driving section including a vertical scanning circuit for selecting, on a row basis, pixels from which to read out signals, and a vertical shutter scanning circuit for selecting, on a row basis, pixels for which to perform a shutter operation prior to selection of a read pixel row by the vertical scanning circuit; and
a horizontal scanning section including a horizontal scanning circuit for sequentially selecting the pixels of the read pixel row selected by the vertical scanning circuit and a shutter pixel row selected by the vertical shutter scanning circuit, and a horizontal shutter scanning circuit for selecting, on a pixel basis, a pixel for which to perform a shutter operation prior to the pixel selection by the horizontal scanning circuit,
wherein a horizontal selection pulse that is output in selecting a first pixel by the horizontal scanning circuit or the horizontal shutter scanning circuit also serves as a read pulse for a second pixel that is adjacent to the first pixel in a column direction.

2. The solid-state imaging device according to claim 1, wherein, in the vertical driving section, the vertical scanning circuit and the vertical shutter scanning circuit are driven by pulse signals having different phases.

3. A solid-state imaging device comprising:
a pixel section in which unit pixels are arranged in matrix form and a signal of each pixel is output as an electrical signal;
a vertical driving section including a vertical scanning circuit for selecting, on a row basis, pixels from which to read out signals, and a vertical shutter scanning circuit for selecting, on a row basis, pixels for which to perform a shutter operation prior to selection of a read pixel row by the vertical scanning circuit; and
a horizontal scanning section including a horizontal scanning circuit for sequentially selecting the pixels of the read pixel row selected by the vertical scanning circuit and a shutter pixel row selected by the vertical shutter scanning circuit, and a horizontal shutter scanning circuit for selecting, on a pixel basis, a pixel for which to perform a shutter operation prior to the pixel selection by the horizontal scanning circuit,
wherein a read pulse that is output in selecting a first pixel by the horizontal scanning circuit or the horizontal shutter scanning circuit also serves as a reset pulse for a second pixel that is adjacent to the first pixel in a column direction.

4. The solid-state imaging device according to claim 3, wherein, in the vertical driving section, the vertical scanning circuit and the vertical shutter scanning circuit are driven by pulse signals having different phases.

5. A driving method of a solid-state imaging device in which unit pixels are arranged in matrix form and a signal of each pixel is output as an electrical signal, comprising:
selecting, on a row basis, pixels for which to perform a shutter operation, and selecting a row of the selected pixels as a read pixel row from which to read a signal after a lapse of a first exposure time; and
selecting, on a pixel basis, a pixel for which to perform a shutter operation from the pixels of the selected read pixel row, and reading out a signal of the selected pixel after a lapse of a second exposure time,
wherein a horizontal selection pulse that is output in selecting a first pixel also serves as a read pulse for a second pixel that is adjacent to the first pixel in a column direction.

6. The driving method according to claim 5, wherein the selecting is driven by pulse signals having different phases.

7. A camera using a solid-state imaging device comprising:
a pixel section in which unit pixels are arranged in matrix form and a signal of each pixel is output as an electrical signal;
a vertical driving section including a vertical scanning circuit for selecting, on a row basis, pixels from which to read out signals, and a vertical shutter scanning circuit for selecting, on a row basis, pixels for which to perform a shutter operation prior to selection of a read pixel row by the vertical scanning circuit; and
a horizontal scanning section including a horizontal scanning circuit for sequentially selecting the pixels of the read pixel row selected by the vertical scanning circuit and a shutter pixel row selected by the vertical shutter scanning circuit, and a horizontal shutter scanning circuit for selecting, on a pixel basis, a pixel for which to perform a shutter operation prior to the pixel selection by the horizontal scanning circuit,
wherein a horizontal selection pulse that is output in selecting a first pixel by the horizontal scanning circuit or the horizontal shutter scanning circuit also serves as a read pulse for a second pixel that is adjacent to the first pixel in a column direction.

8. The camera according to claim 7, wherein, in the vertical driving section, the vertical scanning circuit and the vertical shutter scanning circuit are driven by pulse signals having different phases.

9. A driving method of a solid-state imaging device in which unit pixels are arranged in matrix form and a signal of each pixel is output as an electrical signal, comprising:
selecting, on a row basis, pixels for which to perform a shutter operation, and selecting a row of the selected pixels as a read pixel row from which to read a signal after a lapse of a first exposure time; and
selecting, on a pixel basis, a pixel for which to perform a shutter operation from the pixels of the selected read pixel row, and reading out a signal of the selected pixel after a lapse of a second exposure time,
wherein a read pulse that is output in selecting a first pixel also serves as a reset pulse for a second pixel that is adjacent to the first pixel in a column direction.

10. The driving method according to claim 9, wherein the selecting is driven by pulse signals having different phases.

11. A camera using a solid-state imaging device comprising:
a pixel section in which unit pixels are arranged in matrix form and a signal of each pixel is output as an electrical signal;
a vertical driving section including a vertical scanning circuit for selecting, on a row basis, pixels from which to read out signals, and a vertical shutter scanning circuit for selecting, on a row basis, pixels for which to perform a shutter operation prior to selection of a read pixel row by the vertical scanning circuit; and
a horizontal scanning section including a horizontal scanning circuit for sequentially selecting the pixels of the read pixel row selected by the vertical scanning circuit and a shutter pixel row selected by the vertical shutter scanning circuit, and a horizontal shutter scanning circuit for selecting, on a pixel basis, a pixel for which to perform a shutter operation prior to the pixel selection by the horizontal scanning circuit,
wherein a read pulse that is output in selecting a first pixel by the horizontal scanning circuit or the horizontal shutter scanning circuit also serves as a reset pulse for a second pixel that is adjacent to the first pixel in a column direction.

12. The camera according to claim 11, wherein, in the vertical driving section, the vertical scanning circuit and the vertical shutter scanning circuit are driven by pulse signals having different phases.

* * * * *